(12) United States Patent
Cordaro

(10) Patent No.: US 10,865,303 B2
(45) Date of Patent: Dec. 15, 2020

(54) COMPOSITE STRUCTURE HAVING AN INORGANIC COATING ADHERED THERETO AND METHOD OF MAKING SAME

(71) Applicant: The Boeing Company, Chicago, IL (US)

(72) Inventor: James Frank Cordaro, Ridgecrest, CA (US)

(73) Assignee: THE BOEING COMPANY, Chicago, IL (US)

( * ) Notice: Subject to any disclaimer, the term of this patent is extended or adjusted under 35 U.S.C. 154(b) by 216 days.

(21) Appl. No.: 15/873,068

(22) Filed: Jan. 17, 2018

(65) Prior Publication Data

US 2018/0208759 A1    Jul. 26, 2018

Related U.S. Application Data

(63) Continuation of application No. 13/421,428, filed on Mar. 15, 2012.

(Continued)

(51) Int. Cl.
*B05D 7/02*  (2006.01)
*C08L 63/00*  (2006.01)

(Continued)

(52) U.S. Cl.
CPC .............. *C08L 63/00* (2013.01); *B05D 1/185* (2013.01); *B05D 7/02* (2013.01); *B82Y 30/00* (2013.01);

(Continued)

(58) Field of Classification Search
CPC .. B05D 1/185; B05D 7/02; B05D 7/50; C08L 63/00; C09D 1/04; Y10T 428/31511;

(Continued)

(56) References Cited

U.S. PATENT DOCUMENTS 3,669,417 A    6/1972  Cornwell
4,046,794 A    9/1977  Pepe et al.

(Continued)

FOREIGN PATENT DOCUMENTS

EP    0 154 985 A2    9/1985
JP    S50-53423 A    9/1973

(Continued)

OTHER PUBLICATIONS

European Search Report for Application No. 12174496.5; dated Nov. 27, 2012.

(Continued)

*Primary Examiner* — Kirsten Jolley
(74) *Attorney, Agent, or Firm* — Alston & Bird LLP

(57) ABSTRACT

The present disclosure provides a composite structure and associated method for preparing a composite substrate comprising an inorganic coating that is adhered to an organic-based substrate via an adhesion promoting agent comprising a molecule having a urea moiety at one end of the molecule and an alkoxysilane moiety at the other end of the molecule. The use of adhesion promoting agent having at least one of an amine or imine moiety and an alkoxysilane moiety promotes tight adhesion of the inorganic coating to the substrate.

20 Claims, 2 Drawing Sheets

Related U.S. Application Data

(60) Provisional application No. 61/503,881, filed on Jul. 1, 2011.

(51) Int. Cl.
| | |
|---|---|
| *B05D 1/18* | (2006.01) |
| *B82Y 30/00* | (2011.01) |
| *B82Y 40/00* | (2011.01) |
| *C09D 1/04* | (2006.01) |
| *C08K 5/544* | (2006.01) |
| *C08K 5/5455* | (2006.01) |

(52) U.S. Cl.
CPC ............... *B82Y 40/00* (2013.01); *C09D 1/04* (2013.01); *C08K 5/544* (2013.01); *C08K 5/5455* (2013.01); *Y10T 428/31511* (2015.04); *Y10T 428/31515* (2015.04); *Y10T 428/31522* (2015.04)

(58) Field of Classification Search
CPC .... Y10T 428/31522; Y10T 428/31515; C08K 5/544; C08K 5/5455
See application file for complete search history.

(56) References Cited

U.S. PATENT DOCUMENTS

| | | | |
|---|---|---|---|
| 4,309,473 | A | 1/1982 | Minamisawa et al. |
| 4,718,993 | A | 1/1988 | Cupta et al. |
| 4,956,217 | A | 9/1990 | Heitkamp |
| 5,087,512 | A | 2/1992 | Uihlein et al. |
| 5,164,003 | A | 11/1992 | Bosco et al. |
| 5,218,061 | A | 6/1993 | Kajiwara et al. |
| 5,310,422 | A * | 5/1994 | Abdel-Latif .......... C04B 41/009 106/286.1 |
| 5,366,670 | A | 11/1994 | Giner et al. |
| 5,460,864 | A | 10/1995 | Heitkamp |
| 5,554,672 | A | 9/1996 | Saito et al. |
| 5,820,669 | A | 10/1998 | Cordaro |
| 6,099,637 | A | 8/2000 | Cordaro |
| 6,194,477 | B1 | 2/2001 | Cawse et al. |
| 6,217,978 | B1 | 4/2001 | Murase et al. |
| 6,284,364 | B1 | 9/2001 | Sugizaki et al. |
| 6,361,866 | B1 | 3/2002 | Ogima et al. |
| 6,478,259 | B2 | 11/2002 | Cordaro |
| 6,478,529 | B1 | 11/2002 | Willey et al. |
| 6,562,408 | B1 | 5/2003 | Costa et al. |
| 6,576,290 | B2 | 6/2003 | Cordaro et al. |
| 6,691,414 | B2 | 2/2004 | Harding |
| 7,718,227 | B2 | 5/2010 | Cumberland et al. |
| 7,820,283 | B2 | 10/2010 | Mittal et al. |
| 2002/0056791 | A1 | 5/2002 | Cordaro |
| 2002/0157859 | A1 | 10/2002 | Vasoya et al. |
| 2002/0168474 | A1 | 11/2002 | Cordaro |
| 2004/0033315 | A1 | 2/2004 | Trabesinger et al. |
| 2005/0214550 | A1 | 9/2005 | Kawamura |
| 2006/0178495 | A1 | 8/2006 | van Ooij et al. |
| 2007/0066768 | A1 | 3/2007 | Gauthier et al. |
| 2007/0197686 | A1 | 8/2007 | Dimanshteyn et al. |
| 2008/0045639 | A1 | 2/2008 | Cumberland et al. |
| 2010/0024336 | A1 | 2/2010 | Stevenson et al. |
| 2011/0097568 | A1 * | 4/2011 | Kamae ............... C08G 59/3209 428/222 |
| 2011/0244225 | A1 | 10/2011 | Hattori et al. |
| 2011/0244255 | A1 | 10/2011 | Takamori |

FOREIGN PATENT DOCUMENTS

| | | |
|---|---|---|
| JP | 58157878 | 9/1983 |
| JP | 1079292 | 3/1989 |
| JP | H5 170952 A | 7/1993 |
| JP | H5 230232 A | 9/1993 |
| JP | 2000-352398 A | 12/2000 |
| JP | 2001-316505 A | 11/2001 |
| JP | 2002-505249 A | 2/2002 |
| JP | 2003-534440 A | 11/2003 |
| JP | 2006-159770 A | 6/2006 |
| JP | 2006-297929 A | 11/2006 |
| JP | 2008-230237 A | 10/2008 |
| KR | 10 1034560 B1 | 5/2011 |
| WO | WO 99/44957 A1 | 9/1999 |
| WO | WO 01/68755 A1 | 9/2001 |
| WO | WO 2010/053092 | 5/2010 |
| WO | WO 2010/149729 A1 | 12/2010 |

OTHER PUBLICATIONS

European Search Report for Application No. EP 14 15 2253 dated Apr. 16, 2014.
Office Action for Chinese Application No. 201210224071.0 dated Feb. 1, 2016.
Office Action for Chinese Application No. 201210224071.0 dated Jul. 21, 2015.
Office Action for Japanese Application No. 2012-143671 dated Apr. 5, 2016.
SiSiB® Silanes from Power Chemical Corporation; Your Reliable Partner; Jun. 2009.
Office Action for U.S. Appl. No. 13/421,428, dated May 6, 2019, 46 pages.
Office Action for U.S. Appl. No. 13/421,428, dated Mar. 28, 2018, 31 pages.
Choi et al., "Effect of Water Addition on the Cure Kinetics of an Epoxy-Amine thermoset", Journal of Polymer Science Part A, Polymer Chemistry. 49, dated (2011), pp. 4650-4659.
Office Action for U.S. Appl. No. 13/421,428 dated Nov. 29, 2018, 31 pages.
Gutowski, V. et al. "Surface Silanization of Polyethylene for Enhanced Adhesion" The Journal of Adhesion, dated Nov. 1993.
Gelest "Silane Coupling Agents: Connecting Across Boundaries" [online] [retrieved Oct. 1, 2019] <http:www.gelest.com> dated (2006).
Chemisorb Merriam Webster NPL document, retrieved Sep. 24, 2019.
Office Action for U.S. Appl. No. 13/421,428 dated Sep. 30, 2019, 50 pages.
U.S. Appl. No. 13/421,428, filed Mar. 15, 2012, US2013/0004774, Pending.
Examiner's Answer for U.S. Appl. No. 13/421,428 dated Jul. 9, 2020, 54 pages.

\* cited by examiner

COMPOSITE STRUCTURE HAVING AN INORGANIC COATING ADHERED THERETO AND METHOD OF MAKING SAME

CROSS REFERENCE

This application is a continuation of U.S. application Ser. No. 13/421,428, filed Mar. 15, 2012, which claims the benefit of U.S. Provisional Application No. 61/503,881, filed Jul. 1, 2011, the entire contents of which are incorporated herein by reference.

FIELD

The present disclosure relates generally to composite structures having inorganic thermal control coatings, and in particular to methods of preparing composite structures having an inorganic thermal coating.

BACKGROUND

In recent years, there has been an increasing desire to use composite materials in various structures. These composites are generally lightweight and therefore provide an opportunity to design lighter structures that may be useful in vehicles having a longer range, improved fuel efficiency, or a greater payload, depending upon design criteria.

Composites generally include reinforcing filler encapsulated in a resin. The filler material may be fibers, particulates, woven fabrics, or may be present in any other appropriate shape and form. The filler material may vary, and may include for example carbon fiber, graphite, fiber glass, and other appropriate materials. The resins may include for example the family of thermoplastic or thermosetting resins such as epoxy, phenolic, and other suitable engineering resins.

Such composites generally may have limited capabilities for controlling thermal exposure. For example, spacecraft, such as satellites and deep-space craft, are exposed to a wide range of thermal conditions during service. A side facing the sun is heated by absorption of direct solar radiation, while a side facing the void of space is cooled by emission of thermal radiation. If the temperature of the structure or payload becomes too hot or too cold, structural distortion can occur resulting in reduced system capability. Furthermore, payloads such as electronics, batteries and other critical systems can experience lower efficiency, non-operation, shortened lifetimes or failures. Thermal control of the spacecraft is therefore important. Various techniques have been developed to reduce temperature variations in external structural elements such as antennas and booms, and to maintain the interior of the spacecraft at a temperature suitable for sensitive equipment, payloads, and occupancy by human beings.

In one thermal control approach, the external surface of the spacecraft is covered with an inorganic thermal coating material. The coating is designed to absorb very little solar radiation, yet efficiently radiate thermal energy in the infrared spectrum, thus biasing the overall temperature of the satellite structure on which it is disposed towards cooler temperatures. The coating is substantially stable to the radiation and low pressure gaseous environment encountered in space without losing its thermal properties by discoloring, darkening, or otherwise degrading over time in the harsh environment of low to high earth orbit. For some applications, the coating also must be sufficiently electrically conductive to dissipate electrostatic charge on the surface of the spacecraft.

Generally, inorganic coating materials have poor adhesion to composite materials, and have therefore been limited to being applied to aluminum substrates. Accordingly, there exists a need to develop improved composite materials and methods of preparing same in which the composite material has an inorganic coating adhered to a thermoplastic or thermoset substrate.

BRIEF SUMMARY

The present disclosure is directed to a composite structure and associated method for preparing a composite substrate that may address one or more of the aforementioned problems. In one embodiment, the present disclosure provides a composite structure comprising an inorganic coating that is adhered to an epoxy-based substrate via an adhesion promoting agent comprising a molecule having a urea moiety at one end of the molecule and an alkoxysilane moiety at the other end of the molecule. The use of adhesion promoting agent having a urea moiety and an alkoxysilane moiety promotes tight adhesion of the inorganic coating to the substrate.

In one embodiment, the adhesion promoting agent may have the following structure as shown in formula (I) below:

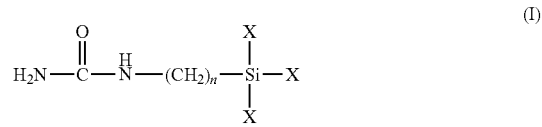

wherein X is an alkoxy group having from 1 to 3 carbon atoms; and
n is a number from 1 to 5.

In some embodiments, the adhesion promoting agent has a structure selected from formulas (II) (1-[3-(trimethoxysilyl)propyl]urea) and (III) (1-[3-(triethoxysilyl)propyl]urea) below:

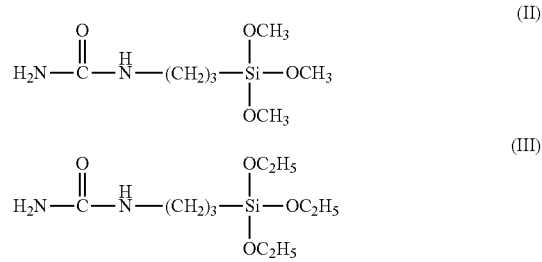

In addition, the adhesion promoting agent can be present as in formulas (II) and (III), above, or any combination wherein X is a methoxy or ethoxy. For example, in some embodiments, the adhesion promoting agent may comprise a "mixed" molecule having both methoxy and ethoxy moieties.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all embodiments of the disclosure are shown. Indeed, these disclosure may be embodied in many different forms and should not be construed as limited to the embodiments set forth herein; rather, these embodiments are provided so that this disclosure will satisfy applicable legal requirements. Like numbers refer to like elements throughout.

Figure 1:
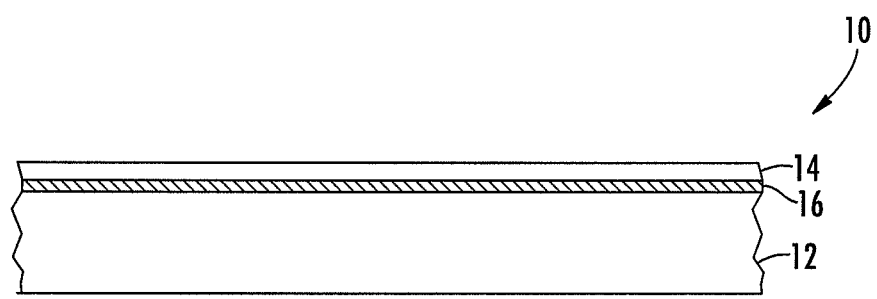
FIG. 1 is a cross-sectional view of a first composite structure in accordance with an exemplary embodiment of the present disclosure.

Embodiments of the present disclosure are directed to composite materials having an inorganic coatings bonded thereto and methods of preparing same. With reference to FIG. 1, a composite structure in accordance with an embodiment of the disclosure is illustrated and broadly designated by reference numeral 10. Composite structure 10 comprises an inorganic coating 14 that is adhered to an epoxy resin-based substrate 12. A layer 16 comprising an adhesion promoting agent is disposed between the inorganic coating 14 and the substrate 12. The adhesion promoting agent comprises an organic molecule having a urea moiety at one end of the molecule and an alkoxysilane moiety at the other end of the molecule. The inventor of the present disclosure has found that the use of an adhesion promoting agent having a urea moiety and an alkoxysilane moiety promotes tight adherence of the inorganic coating to the substrate.

Figure 2:
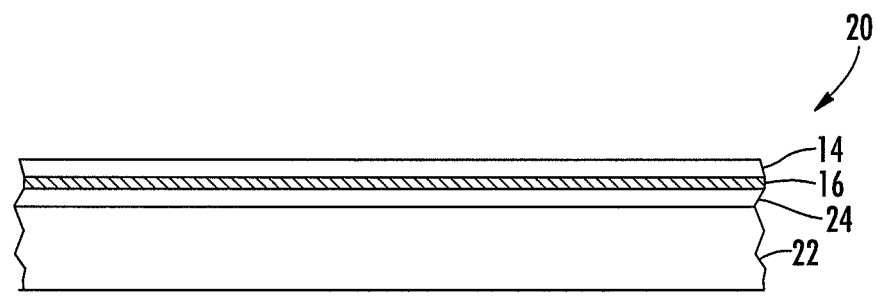
FIG. 2 is a is a cross-sectional view of a second composite structure in accordance with an exemplary embodiment of the present disclosure.

FIG. 2 illustrates an embodiment of the disclosure in which the substrate of the composite structure may comprise any material. In this embodiment, the composite structure 20 comprises an inorganic coating 14 that is adhered to a substrate 22. A layer 16 comprising an adhesion promoting agent is disposed between the inorganic coating 14 and an epoxy based resin layer 24 that overlies substrate 22. In one embodiment, the epoxy based resin layer may comprise a paint or similar coating that has been applied to the surface of the substrate 22.

The inorganic coating may be characterized as being tightly-adhered to the substrate. Adhesion strength may be tested in accordance with ASTM D 3359 Method A. A tape with minimum peel strength 60 oz per inch (as tested per ASTM D 3359 Method A), is placed over the a X-scored marking per D 3359 Method A, pressed down and then pulled away abruptly. The amount of material pulled off with the tape is compared with a standard to rate the adhesion. In these tests, the inorganic coatings tested showed very little if any removal and qualify as Class 5 of ASTM D 3359 Method A; i.e., less than 5% of the inorganic coating is present on the pulled-away tape, and more typically less than 1%. In one embodiment, substantially no inorganic coating is present on the pulled-away tape.

As briefly discussed above, the adhesion promoting agent comprises an organic molecule having a urea moiety (e.g., $H_2N$—(CO)—) at one end of the molecule and an alkoxysilane moiety at the other end of the molecule. In one embodiment, the adhesion promoting agent comprises a molecule having a silane moiety with a plurality of alkoxy groups at one end and a urea moiety at the other end.

Suitable adhesion promoting agents in accordance with embodiments of the present disclosure may have the following structure as shown in formula (I) below:

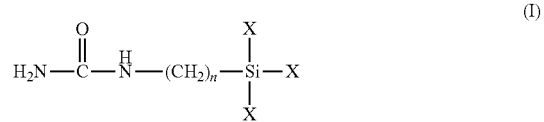

wherein X is an alkoxy group having from 1 to 3 carbon atoms, and
n is a number from 1 to 5.

In one embodiment, the adhesion promoting agent has a structure selected from formulas (II) (1-[3-(trimethoxysilyl)propyl]urea) and (III) (1-[3-(triethoxysilyl)propyl]urea) below:

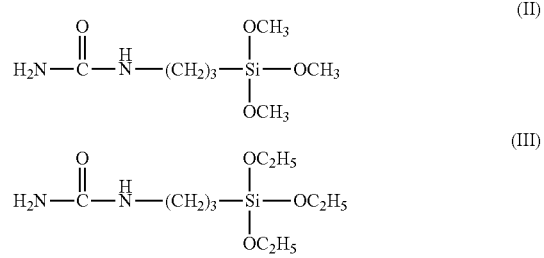

In some embodiments, the adhesion promoting agent can be present as in formulas (II) and (III), above, or any combination wherein X is a methoxy or ethoxy. For example, in some embodiments, the adhesion promoting agent may comprise a "mixed" molecule having both methoxy and ethoxy moieties. In further embodiments, the adhesion promoting agent may include compounds having a silane moiety and more than one urea-like moiety (e.g., $H_2N$—(CO)). For example, in some embodiments the adhesion promoting agent may include a moiety having two or more urea-like functional groups. In addition, the adhesion promoting agent may include compounds in which the alkyl group is attached to two or more urea-like moieties.

While not wishing to be bound by theory, it is believed that the adhesion promoting agents of formulas (I)-(III) are particularly useful in bonding of silicate containing inorganic coatings to epoxy-based materials and substrates (collectively referred to herein as simply the substrate). In some embodiments, it is theorized that the alkoxy moieties form bonds directly to silicates in the inorganic coating and the urea moieties form bonds to chemisorbed water in the epoxy based substrate. In particular, it has been observed that it may be desirable to catalyze the adhesion promoting agent with a base (e.g., pH 7+ to 14) to promote bonding between the adhesion promoting agent and the epoxy based substrate. For example, it is theorized that the bonding of the epoxy based substrate to the inorganic coating may occur according to the following mechanism:

(1) an epoxy resin matrix having chemisorbed water (—OH) on or near the surface:

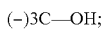

(2) an adhesion promoting agent (e.g., $H_2N$—(CO)—NH—$(CH_2)_3$—$SiX_3$ having an alkoxy groups at one end and a urea moiety (H₂N—(CO)—) at the other end is applied to the surface of the epoxy resin matrix;

(3) in the presence of a chemical base (e.g., OH⁻), the urea moiety reacts with the chemisorbed water in the epoxy resin matrix to form a carbon-nitrogen bond "C—N" to the surface of the epoxy based resin:

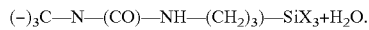

(-)₃C—N—(CO)—NH—(CH₂)₃)—SiX₃+H₂O.

Please note that in the above-described mechanism, the reaction between the adhesion promoting agent and the inorganic coating is also occurring, but has been left out for simplicity.

In addition, the inventor has also discovered that that above-described reaction between the epoxy based substrate and the adhesion promoting agent can be improved in some embodiments by exposing the substrate/material to water or humid environments prior to applying the adhesion promoting agent to the substrate.

As discussed previously, it has been observed that catalyzing the adhesion promoting agent with a base helps to promote bonding between the adhesion promoting agent and the epoxy based substrate. Advantageously, the inorganic coating itself may serve as the catalyst that initiates bonding between the adhesion promoting agent and the epoxy based substrate. Generally, the inorganic coating is base material having a pH of about 11 or greater. Upon application of the inorganic coating to the adhesion promoting agent, the inorganic coating catalyzes the chemical bonding reaction to thereby form a composite structure comprising an inorganic coating that is adhered to an epoxy-based substrate via the adhesion promoting agent.

Advantageously, the adhesion promoting agents can be used to bond the inorganic coating to the substrate in the absence of treating the surface of the substrate with an acid or base, such as treatment with hydrofluoric acid, phosphoric acid, sodium hydroxide, lithium hydroxide, and the like.

In addition, it has also been shown that adhesion of the inorganic thermal coating to the substrate can be provided in the absence of surface roughness of the substrate. As such, composite structures in accordance with the disclosure can be provided in which further abrasion treatment of the substrate is not necessary for adhesion. In fact, it has been observed that abrasion of the epoxy based substrate/material may actually be detrimental to the bonding process. While not wishing to be bound by theory, it is believed that abrasion (e.g., sanding) may remove a surface layer and expose underlying components of the substrate, such a graphite or carbon fibers, for example, and as a result, reduce the surface area of the epoxy based substrate/material that is available for bonding. In addition, abrasion may also result in removing a portion of the hydrated surface layer of the epoxy based substrate/material, which would result lower the amount of chemisorbed water that is available for boding with the adhesion promoting agent.

As discussed above, the presence of chemisorbed water in the epoxy based substrate/material is believed to improve bonding between the adhesion promoting agent and the epoxy based substrate/material. In some embodiments it may therefore be desirable to first "humidify" the surface of the epoxy based substrate/material prior to applying the adhesion promoting agent. In some embodiments, the surface of the epoxy based substrate/material may be humidified by exposing the surface to water, mist, a humid atmosphere, and the like.

The selection of the inorganic coating may dependent on the intended use of the composite structure. It should be recognized that a wide variety of different inorganic coatings may used in various embodiments of the disclosure. For example, the inorganic coating may include one or more metallic constituents, metallic oxides, silica-based constituents, and combinations thereof. In one embodiment, the inorganic coating is silica based, such as potassium silicate, sodium silicates, and mixtures thereof.

In some embodiments, the inorganic coating is selected so that it has a pH greater than 7. For example, in one embodiment, the inorganic coating comprises an inorganic pigment (e.g., metal oxide) dispersed in an inorganic binder (e.g., potassium silicate). Potassium silicate as a solution in water is a basic material having a pH that is typically greater or equal to about 11. In such an embodiment, the inorganic coating has a pH that is capable of catalyzing the reaction between the adhesion promoting agent and the epoxy based substrate/material.

In some embodiments, it may be possible to use inorganic coatings having a pH that is neutral or acidic. In such an embodiment, it may be desirable to first treat the applied layer of adhesion promoting agent with a basic material, such as an alkaline substance, in order to catalyze bonding of the adhesion promoting agent to the substrate. For example, the adhesion promoting agent may be catalyzed by blowing ammonia vapor over the applied layer of the adhesion promoting agent.

Suitable inorganic coatings that may be used in one or more embodiments of the disclosure are described in greater detail in U.S. Pat. Nos. 5,820,669, 6,099,637, 6,478,259, 6,576,290, and 7,718,227, the contents of which are hereby incorporated by reference.

The epoxy-based substrate/material may be selected from a wide variety of epoxy-based substrates/materials. For example, the substrate may comprise a carbon fiber epoxy matrix composite; glass fiber epoxy matrix composite; an epoxy clear coat layer applied to a substrate (e.g., thermoplastic, thermoset, or other material based substrates); epoxy containing paints, such as metal filled paints with an epoxy resin matrix, and the like.

In one embodiment, the disclosure is directed to a composite structure for use in a spacecraft. In particular, substrates 12, 22 may be any component of a spacecraft, such as, for example, an inflatable component (e.g., a panel, truss, or array), a sun shield (such as for deployable arrays, reflectors, or reconfigurable reflectors), or a thermal blanket. The inorganic coating 14 comprises an inorganic material that is disposed at an exterior surface of the composite. In embodiments for use in spacecraft, the inorganic material may have a radiation absorptance (α) of less than about 0.2 and an emissivity (ε) of at least about 0.6, and more typically at least about 0.7. As a result, inorganic coating 14 is a relatively poor absorber of solar radiation, yet radiates thermal energy efficiently in the infrared spectrum, thus biasing the overall temperature of the substrate 14 towards cooler temperatures.

In one embodiment, the adhesion promoting agent can be applied to the substrate via rubbing. For example, the adhesion promoting agent may be dispersed in a suitable carrier solvent and then rubbed onto the surface of substrate using a suitable cloth or wipe. Suitable solvents may include methanol, ethanol, anhydrous isopropyl alcohol, and the like. Generally, the promoting agent is present in the carrier solvent at a weight percent that is between 1 to 10 weight %, based on the overall weight of the loaded solvent, and in particular, from about 2 to 8 weight %, and more particularly at about 5 weight %. Other methods that may be used to apply the adhesion promoting agent to the epoxy based substrate/material may include conventional techniques, such as, spraying, brushing, doctor blade coating, and the like, although not necessarily with equivalent results.

In some embodiments, the inorganic coating is applied as multiple layers onto the surface of the layer of the adhesion promoting agent. In one embodiment, the inorganic coating is first applied to the layer of the adhesion promoting agent as a "mist coat" (also known as a "fog coat") in which the inorganic coating is initially applied as a very fine coating. Applying an initial mist coat may 1) help to catalyze the bonding reaction between the adhesion promoting agent and the substrate, as discussed above, and 2) may help reduce running or crawling of the inorganic coating as additional layers are applied. Generally, the initial mist coat is applied to the layer of the adhesion promoting agent and is allowed to set for about 5 to 15 minutes prior to application of a second coat of the inorganic coating.

A useful thickness of the layer of the adhesion promoting agent may be from about 0.5 microns or greater. In one embodiment, the thickness of the layer of the adhesion promoting agent may be greater than any of the following: 0.5 microns, 0.6 microns, 0.7 microns, 0.8 microns, 0.9 microns, 1.0 microns, 1.1 microns, 1.2 microns, 1.3 microns, 1.4 microns, 1.5 microns, 1.6 microns, 1.7 microns, 1.8 microns, 1.9 microns, 2.0 microns, 2.1 microns, 2.2 microns, 2.3 microns, 2.4 microns, 2.5 microns, 2.6 microns, 2.7 microns, 2.8 microns, 2.9 microns, and 3.0 microns. In other embodiments, the thickness of the adhesion promoting agent may be less than any of the following: 3.5 microns, 3.4 microns, 3.3 microns, 3.2 microns, 3.1 microns, 3.0 microns, 2.9 microns, 2.8 microns, 2.7 microns, 2.6 microns, 2.5 microns, 2.4 microns, 2.3 microns, 2.2 microns, 2.1 microns, 1.9 microns, 1.8 microns, 1.7 microns, 1.6 microns, 1.5 microns, 1.4 microns, 1.3 microns, 1.2 microns, 1.1 microns, and 1.0 microns.

After the adhesion promoting agent is applied to the substrate it is allowed to dry. Drying may take place at room temperature and under normal room humidity conditions. Once dried, the inorganic coating is applied onto the layer of the adhesion promoting agent. The inorganic coating can be applied using a variety of methods including brushing, spraying, extrusion coating, draw down, and the like. The inorganic coating is then allowed to dry and cure to form a composite substrate in which the inorganic coating is tightly adhered to the substrate.

After drying and/or curing, the inorganic coating layer may be from about 0.001 inch to about 0.010 inch thick, and in particular, the inorganic coating layer may be from about 0.001 to about 0.007 inch.

The inorganic coating may be applied as a single coat, or as multiple coats which are dried between coats. The total thickness of a single coat or the total thickness of multiple coats is as set forth above. Even where multiple coats are applied, the inorganic coating is still a "single layer" coating, because its composition is substantially homogeneous throughout all of the coats and between the coats.

The composite structure having an inorganic coating may be used in any thermal control application. In one particular embodiment, it is used a structural member of a spacecraft, such as a communications satellite.

Figure 3:
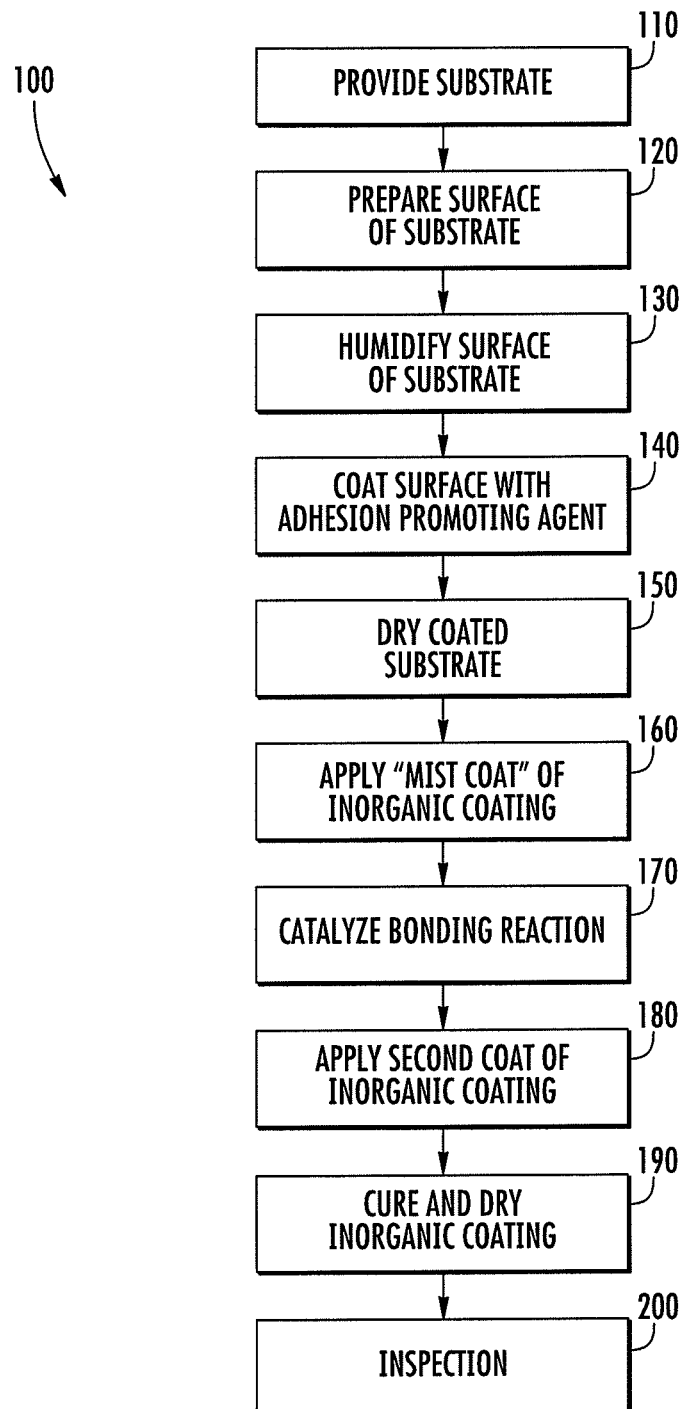
FIG. 3 is a block diagram for a method of preparing a substrate having an inorganic coating layer adhered thereto.

FIG. 3 illustrates an example of an embodiment of a process 100 for applying an inorganic coating onto an organic-based substrate. In process step 110, an epoxy based substrate is provided. In step 120, the surface of the substrate is prepped to receive the adhesion promoting agent thereon. This may involve removal of loose dirt, washing with a mild detergent to degrease, or other cleaning processes. In general, the particular cleaning process employed may depend on the chemical composition of the substrate. After surface preparation, the surface is humidified at step 130. The humidified surface of the substrate is then coated with a layer of the adhesion promoting agent via rubbing to a desired thickness, in process 140. The layer of the adhesion promoting agent is dried, typically at room temperature and humidity, in process 150. During the drying step, the carrier liquid is evaporated to leave a layer of the adhesion promoting agent. The resulting layer of the adhesion promoting agent may have an oily, film-like appearance and feel. At process step 160, a thin layer of the inorganic coating is applied as a mist coating onto the substrate overlying the adhesion promoting agent layer to a desired thickness. The thus applied mist coating of the inorganic coating layer is then allowed to catalyze the bonding reaction for a desired amount of time at process step 170. A second coating of the inorganic coating layer is then applied over the mist coat at step 180. The inorganic coating layer is then dried and cured to form a tightly adherent coating on the surface of the substrate in process step 190. After a coating of desired thickness has been applied, the coated substrate surface may be inspected by any of a variety of techniques in process step 200. Inspection techniques may test for coating thickness, porosity, bond strength, surface roughness, hardness, etc.

In addition to the exemplary uses described above, the present disclosure may also be used in structural concrete applications. For example, a composite coating in accordance with the present disclosure could be used to tightly adhere coated structural members, such as rebar, bolts, screws, and like, to concrete structures. In these embodiments, the structural members would first be coated with an epoxy-based resin. Prior to being incorporated into a concrete structure, a coating of the adhesion promoting agent would be applied to the epoxy coated structural member. Thereafter, the coated structural member would be added into a wet concrete structure. Since wet concrete is alkaline, it is expected that the wet concrete would catalyze the reaction between the epoxy coating and the adhesion promoting agent to form a tight adhesion between the concrete and the structural member.

EXAMPLES

Example 1

A substrate comprising a glass fiber epoxy matrix composite was select for testing as a substrate. The substrate was cleaned using an appropriate cleaning technique. The substrate was then rinsed with water followed by rinsing with deionized water. A solution containing 5 wt. % of 1-[3-(trimethoxysilyl)-propyl]urea in reagent grad 2-propanol was applied to the surface of the substrate to form a thin layer of the solution on the substrate. The solution was then allowed to dry at room temperature and humidity. The surface of the substrate having a layer of the 1-[3-(trimethoxysilyl)-propyl]urea was then coated with an inorganic coating comprising a potassium silicate. The inorganic coating was then allowed to dry and cure.

The resulting inorganic coating was tightly adhered to the surface of the substrate. The coated substrate was subjected to peel testing in which none of the inorganic coating was detected on the pulled-away tape.

Comparative Example 1

A substrate was prepared and coated with an inorganic coating as described in Example 1 above, with the exception that the substrate was not coated with an adhesion promoting agent. Following curing of the inorganic coating, the substrate was subjected to the peel test. A significant portion of the coating was present on the pulled-way test.

The process described in Example 1, was also repeated with various surface treatments including sanding/roughing of the surface and chemical treatments, such as treatment with basic and acidic substances prior to applying the adhesion promoting agent or the inorganic coating. The test results showed that adhesion of the inorganic coating to the substrate was independent of both mechanical (e.g., sanding/roughening) and chemical (e.g., treatment with acid/basic substances).

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of preparing a composite structure comprising:
   providing a substrate comprising an epoxy-based matrix;
   humidifying an outer surface of the substrate to form chemisorbed water on or near said outer surface;
   applying a solution containing an adhesion promoting agent to said outer surface of the epoxy-based matrix, the adhesion promoting agent having the following formula:

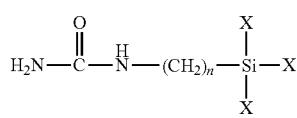

(I)

wherein X is an alkoxy group having from 1 to 3 carbon atoms; and
n is a number from 1 to 5;
   drying the solution to form a layer containing the adhesion promoting agent;
   applying an inorganic coating over the layer of the adhesion promoting agent; and
   curing the inorganic coating to provide a composite substrate in which the inorganic coating layer is tightly adhered to the substrate.

2. The method of claim 1, wherein the solution containing the adhesion promoting agent comprises isopropyl alcohol.

3. The method of claim 1, wherein the adhesion promoting agent comprises a molecule having the following formula:

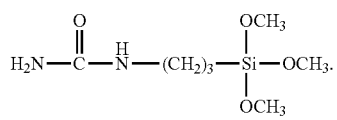

(II)

4. The method of claim 1, further comprising the step of humidifying the surface of the substrate prior to the step of applying the adhesion promoting agent.

5. The method of claim 1, wherein the step of applying an inorganic coating over the layer of the adhesion promoting agent comprises applying a first layer of inorganic coating as a mist coat.

6. The method of claim 5, further comprising the step of applying a second layer of inorganic coating, wherein the second layer of the inorganic coating is applied following at least 5 minutes after the application of the first layer of the inorganic coating.

7. The method of claim 1, wherein the inorganic coating has a pH greater than 7.

8. The method of claim 1, wherein the inorganic coating has a pH of about 11 or greater.

9. The method of claim 1, wherein the adhesion promoting agent is applied to the substrate by rubbing the adhesion promoting agent onto the surface of the substrate.

10. The method of claim 9, wherein the inorganic coating comprises a potassium silicate based resin.

11. The method of claim 1, wherein the epoxy-based matrix comprises glass fibers, carbon fibers, or a mixture thereof.

12. A method of preparing a composite structure comprising:
   providing a substrate comprising an epoxy-based matrix;
   humidifying an outer surface of the substrate to form chemisorbed water on or near said outer surface;
   applying a solution containing an adhesion promoting agent to said outer surface of the epoxy-based matrix, the adhesion promoting agent having the following formula:

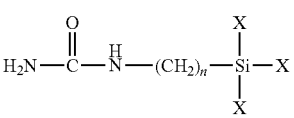

(I)

wherein X is an alkoxy group having from 1 to 3 carbon atoms; and
n is a number from 1 to 5;
   drying the solution to form a layer containing the adhesion promoting agent;
   applying an inorganic coating over the layer of the adhesion promoting agent; and
   curing the inorganic coating to provide a composite substrate in which the inorganic coating layer is tightly adhered to the substrate, wherein the adhesion promoting agent layer is disposed between and separates the outer surface of the substrate from the inorganic coating layer.

13. The method of claim 12, wherein the inorganic coating layer consists of one or more of potassium silicate, sodium silicate, a metal oxide based pigment in combination with a potassium or sodium silicate, or combinations thereof.

14. The method of claim 12, wherein the step of humidifying an outer surface of the substrate comprises exposing the outer surface to water or a humid environment.

15. The method of claim 12, wherein the adhesion promoting agent comprises a molecule having a following formula:

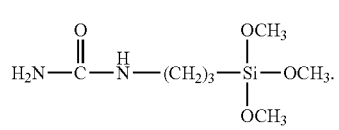
(II)

16. The method of claim 12, wherein the inorganic coating layer consists of potassium silicate.

17. The method of claim 12, wherein the epoxy-based matrix comprises glass fibers.

18. The method of claim 12, wherein the epoxy-based matrix comprises carbon fibers.

19. The method of claim 12, wherein the adhesion promoting agent layer has a thickness greater than 0.5 microns.

20. The method of claim 12, further comprising the step of depositing the epoxy-based matrix as a coating onto a surface of a non-epoxy based material.

* * * * *